Patented Feb. 19, 1946

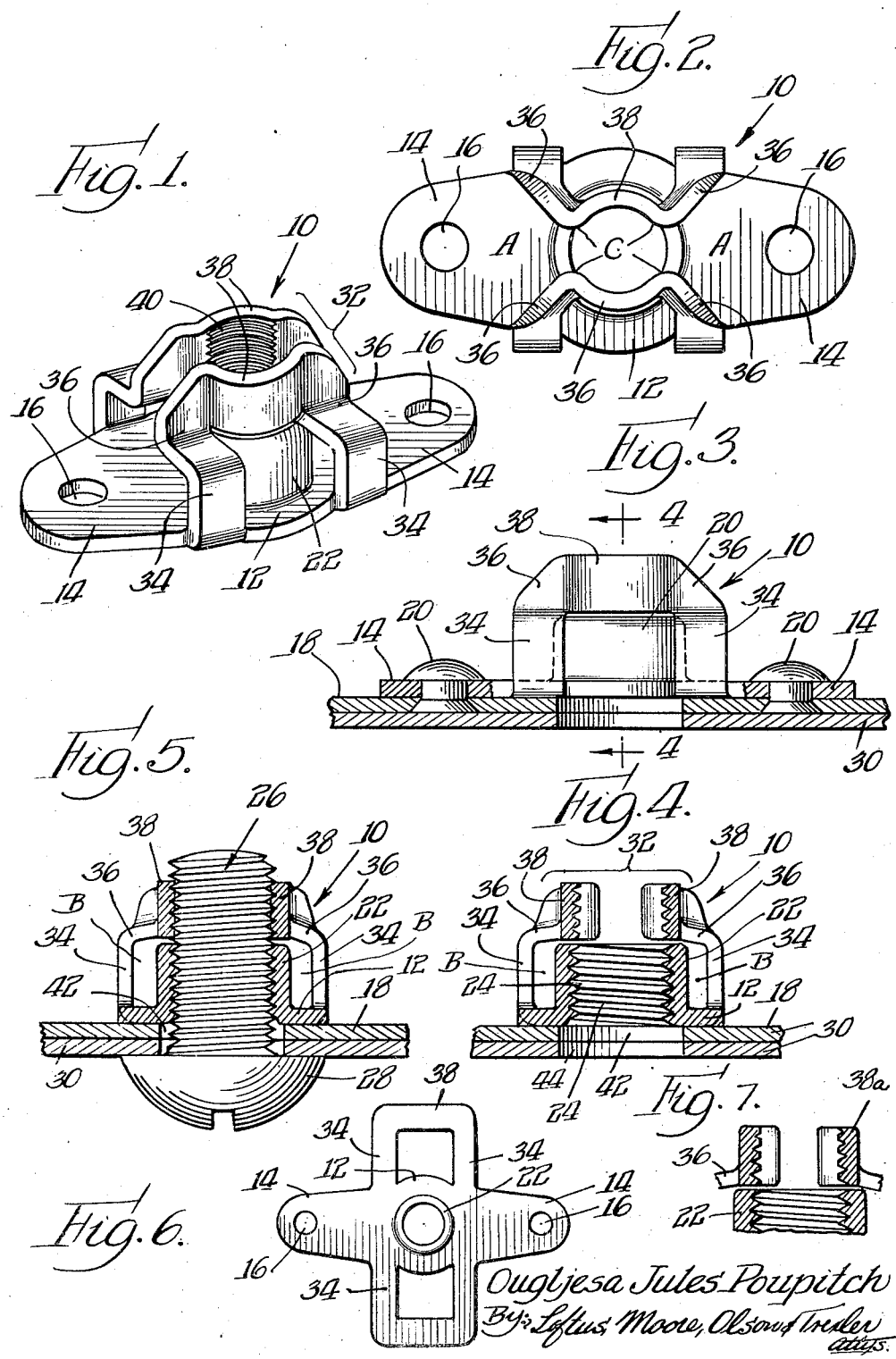

2,395,142

UNITED STATES PATENT OFFICE 2,395,142

LOCK NUT

Ougljesa Jules Poupitch, Chicago, Ill., assignor to Illinois Tool Works, Chicago, Ill., a corporation of Illinois Application July 15, 1944, Serial No. 545,129

7 Claims. (Cl. 151—14)

This invention relates generally to screw locking devices and more particularly to locking devices constructed of sheet metal and provided with resiliently supported thread gripping means.

The present invention contemplates the provision of a fastener device for screws of extremely simple yet sturdy construction which may be very economically produced from sheet metal stock and to this end a fastener device is contemplated wherein a sheet metal base plate having an annular screw accommodating portion has in association therewith novel and efficiently operative screw thread gripping sections.

More specifically, the invention proposes the use of a sheet metal thread locking device as set forth above wherein diametrically positioned segmental sections are supported by a novel arrangement of resilient arms extending laterally of a base plate.

Still more specifically, the present invention contemplates a plate nut fastener device which may be secured in a fixed position to a work part, and which is equipped with resiliently supported segmental thread locking sections of the type referred to above.

The foregoing and other objects and advantages will be more apparent upon consideration of the following detailed description when understood in connection with the accompanying drawing wherein Figure 1 is a perspective view of a thread locking device which represents one embodiment of the present invention;

Figure 2 is a plan view of the device shown in Figure 1;

Figure 3 is a side elevational view of the fastener applied to a work part, portions of the apertured extensions of the base being shown in section to illustrate the manner in which the fastener is riveted to a work part;

Figure 4 is a vertical transverse sectional view taken substantially along the line 4—4 of Figure 3;

Figure 5 is a vertical transverse sectional view similar to Figure 4 disclosing a screw member locked in position by the fastener device;

Figure 6 is a plan view of a blank from which the fastener device shown in the previous figure may be formed; and Figure 7 is a fragmentary sectional view similar to Figure 4 disclosing a slightly modified locking section.

Referring now to the drawing more in detail wherein like numerals have been employed to designate similar parts throughout the various figures, it will be seen that a sheet metal fastener device representative of one embodiment of the invention is designated generally by the numeral 10. This fastener device 10 comprises a base plate or section 12, and oppositely disposed extensions 14 which are provided with fastener or rivet accommodating recesses 16. The base plate 12 and the integral extension plate 14 are adapted to be secured flush with the surface of a work piece 18, Figure 3, by rivets 20. The central portion of the base plate 12 is formed with an annular screw receiving extrusion 22. This extrusion 22 is provided with an internal thread 24 for accommodating a conventional screw member 26, as illustrated in Figure 5. As shown in Figure 5, the shank of the screw extends through the threaded extrusion 22 and the head 28 of the screw is tightened against a work part 30. In this manner the work parts 18 and 30 are secured together.

In order to lock the screw member 26 against inadvertent or unauthorized rotation a locking or split threaded section 32 is provided, see portion included within brackets, as illustrated in Figures 1 and 4. The locking section includes two oppositely disposed identical parts which are formed integral with and bent laterally of the base plate or section 12. Each of these locking parts includes laterally extending resilient supports or arms 34. These supports 34 are hingedly joined at their lower extremities with the base section 12. Bent inwardly from each resilient support 34 is an extension or connecting section 36. These connecting sections 36 serve to couple the extremities of segmental thread engaging sections 38 with the resilient supports 34. These segmental sections 38 arcuately conform with the extrusion 22 as clearly illustrated in Figure 2. The segmental sections are also provided with an internal thread conforming in axial pitch with the thread 24 in the extrusion 22.

The blank from which the fastener may be produced is shown in Figure 6. After this blank has been stamped from a flat sheet of stock the arcuate sections 38 are then formed. Ultimately the arms 34 are bent at right angles to the base plate and the connecting sections 36 are bent laterally of the arms 34. These bending and forming operations cause the segmental sections 38 to be initially positioned as shown in Figure 5. With the segmental sections 38 positioned, as shown in Figure 5, a suitable tap is applied to cause the formation of the internal thread convolutions in the extrusion 22 and the sections 38. Following this tapping operation the arms 34 are sprung slightly inwardly so as to position the segmental sections 38, as shown in Figure 4. In this position the thread gripping surfaces presented by the thread convolutions 40 are positioned inwardly with respect to the maximum diameter of the thread convolutions 24 in the extrusion 22.

It will be apparent from the foregoing that when the advancing extremity of the screw member 26 is rotatably moved beyond the extrusion, said screw member is brought into engagement with the internal thread portions of the segmental sections 38. This causes said sections to be sprung outwardly from the position shown in Figure 4 to the position shown in Figure 5. The resiliency of the spaced laterally extending supports or arms 34 is sufficient to cause the split threaded or segmental sections to firmly bear against the complementary thread convolutions of the screw member 26. The frictional resistance or gripping action thus afforded by the split thread section is sufficient to prevent undesired loosening of the screw member.

Particular attention is directed to the spaced relationship of the arms 34. It will be seen from the plan view in Figure 2 that the spacing of the arms 34 exposes or renders accessible portions of the plate 12. This is important in connection with the manufacture of the device because it readily enables the application of pressure on the base plate during the lateral bending of the resilient arms 34.

In instances where the locking section is sufficiently resilient it may be possible to have the segmental sections 38 positioned, as shown in Figure 4, prior to the tapping operation. As the tap is moved into engagement with the segmental sections 38, these sections spring outwardly to some extent. In other words, a shallower thread is cut in the segmental sections 38. When the tap is removed the segmental sections 38 automatically spring inwardly to the position shown in Figure 4.

In Figure 7 a slightly modified locking section is shown wherein the thread convolutions formed in segmental sections 38a are tapered in depth from the inner side adjacent the extrusion 22 to the outer side. This is accomplished by inserting a tap having a tapering entering extremity which terminates within the segmental sections 38a.

It will also be noted that the segmental sections 38 and 38a adjacently superimpose the extrusion 22 and thus are protected against any appreciable axial displacement. It will also be seen from Figures 4 and 5 that the arms 34 are spaced laterally from the extrusion 22 so as to present openings B. This enables the insertion of securing elements, not shown, in instances where the extensions 14 are not employed. As viewed in Figures 4 and 5 the arms 24, connecting sections 36, base 12 and extrusion 22, provide substantially rectangular openings.

From the foregoing description it will be understood that the present invention contemplates a sheet metal lock nut in which a U-shaped spring extending from the exterior of one side of the base plate is bent to overlie the base plate and is provided at its center portion with an outwardly bowed internally threaded section. The two segmental locking portions present a split threaded section, spring arms being provided to locate the segmental sections in adjacent aligned relationship with an annular threaded section and adapted to urge the halves of the split section against a screw threaded through the annular threaded section of the base. The structure disclosed herein has proven practical not only as a plate nut construction capable of being secured to a work piece by rivets but also as a nut with the integral extensions 14 of the base 12 being eliminated. By having the connecting section 36 joined with the segmental portions 38 by rounded or curved areas C, Figure 2, the thread extremities gradually merge into the sheet stock and thus avoid any abrupt or biting edges in that vicinity which mar the thread surfaces of the screw. In other words, the screw 26 may be turned in either direction within the nut 10 without any possible thread disfigurement by the threads in the nut.

Obviously the invention is not limited to the specific structural details described herein, but is capable of other modifications and changes without departing from the spirit and scope of the appended claims.

The invention is hereby claimed as follows:

1. A lock nut comprising an annular threaded section, a split threaded section superimposing said annular section composed of arcuate portions each having a screw thread engaging surface of substantial arcuate length and axial extent, and spring arms connecting said sections in adjacent aligned relationship and having resiliently yieldable portions extending along sides of the annular section and adapted to urge the halves of the split section against a screw extending through the annular section.

2. A lock nut comprising an annular threaded section, a split threaded section in adjacent superimposing relation to said annular threaded section composed of arcuate portions each having a screw thread engaging surface of substantial arcuate length and axial extent, and means including a pair of spring arms extending along one side of said annular section and a pair of spring arms extending along the opposite side of said annular section, said spring arms connecting said sections in adjacent aligned relationship and adapted to urge the halves of the split section radially against a screw threaded through the annular section.

3. A sheet metal lock nut comprising a base portion, an annular threaded section formed centrally of said base portion, a split threaded section composed of arcuate portions each having a screw thread engaging surface of substantial arcuate length and axial extent, and spring arms connecting the split threaded section with said base portion and positioning said split threaded section in adjacent aligned relationship with respect to the annular threaded section, said arms having resiliently yieldable portions extending along sides of said annular section and adapted to urge the halves of the split section against a screw extending through the annular section.

4. A lock nut comprising a base plate, an annular threaded section on said base plate, a U-shaped spring extending from the exterior of one side of the base plate and bent to overlie the base plate and having at its center an outwardly bowed internally threaded section of substantial axial width adapted to resiliently bear against a screw extending through said annular threaded section.

5. A lock nut comprising a base plate, an annular threaded section on said base plate, and a pair of oppositely disposed U-shaped springs extending from opposite sides of said base plate and bent to overlie the base plate, the center portions of each spring presenting an outwardly bowed internally threaded section of substantial axial width adapted to resiliently engage a screw extending through the annular section.

6. A fastener device of sheet metal including a base section, a helical screw receiving section formed centrally of said base section, and oppositely disposed thread locking sections formed integral with said base section, each thread locking section including a pair of spaced resilient supports extending laterally from said base section along one side of said screw receiving section and an internally threaded segmental section of substantial axial width extending between the outer extremities of said supports, said segmental sections being diametrically spaced and positioned in alignment with said screw receiving section for resiliently gripping a thread of a screw member extending through said screw receiving section.

7. A fastener device of sheet metal including a base section, a helical screw receiving section formed centrally of said base section, and oppositely disposed thread locking sections formed integral with said base section, each thread locking section including a pair of spaced resilient supports extending laterally from said base section along one side of said screw receiving section and an internally threaded segmental section of substantial axial width extending between the outer extremities of said supports, said segmental sections being diametrically spaced and positioned in alignment with said screw receiving section for resiliently gripping a thread of a screw member extending through said screw receiving section, the opposite extremities of the thread portions in said segmental sections gradually blending with the adjacent surface of the sheet metal stock to prevent marring of thread convolutions of the screw member.

OUGLJESA JULES POUPITCH.